Figure 1:
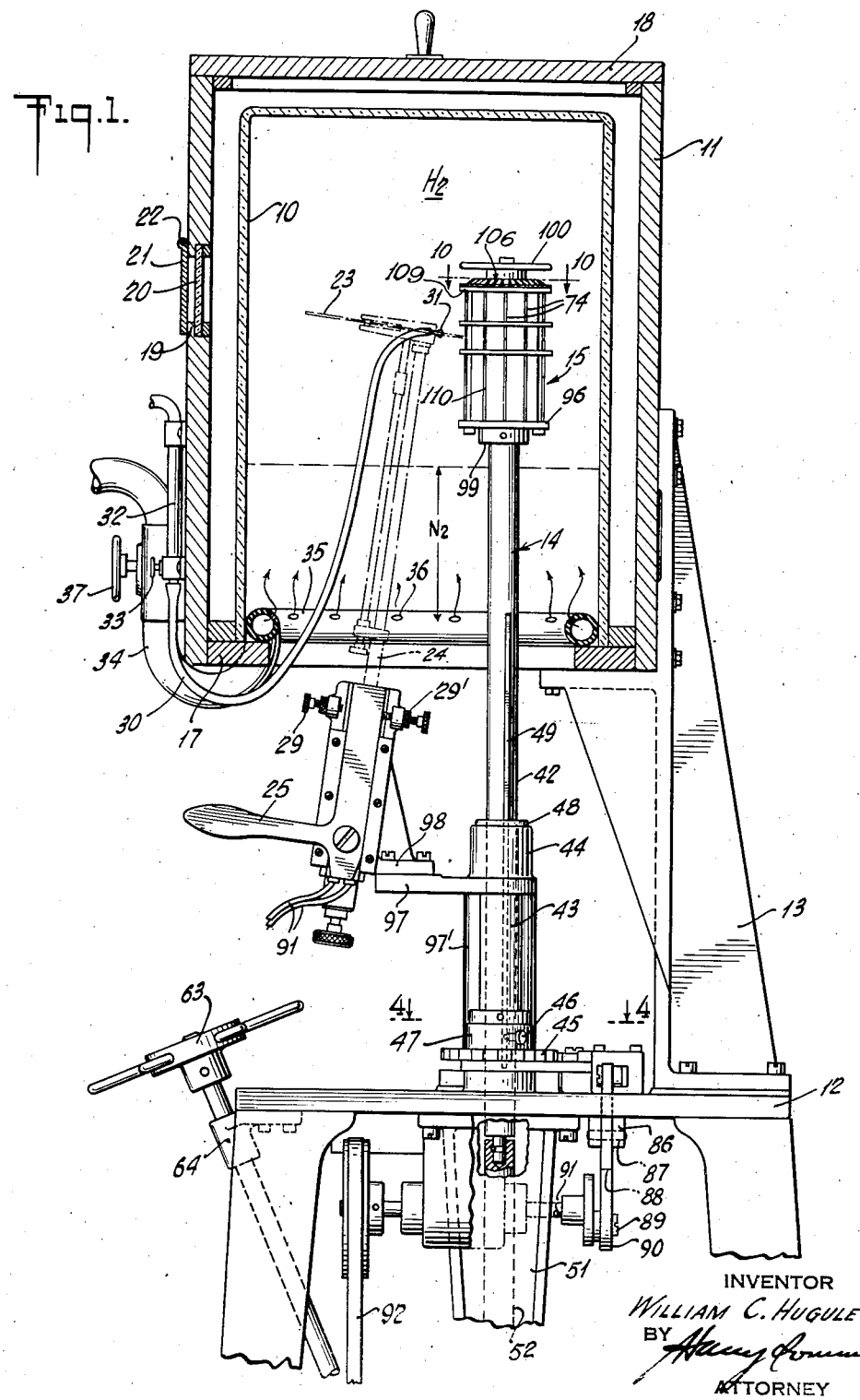

Aug. 13, 1946. W. C. HUGULEY 2,405,828
APPARATUS FOR ARC WELDING
Filed July 28, 1944 3 Sheets-Sheet 2
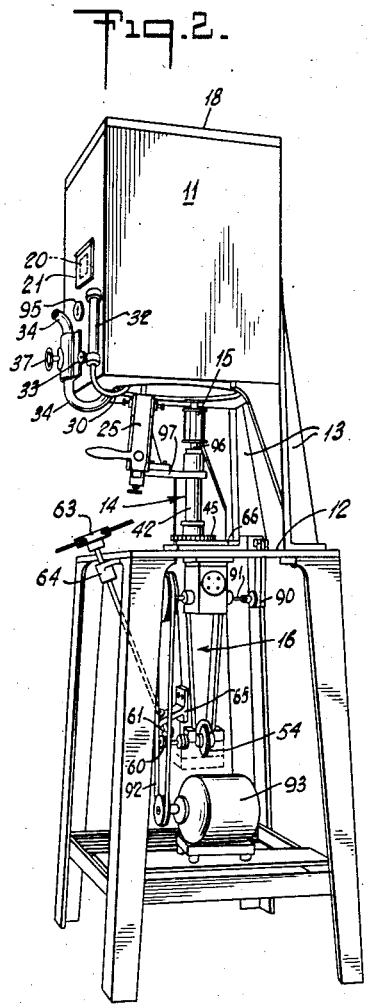
Fig.2.
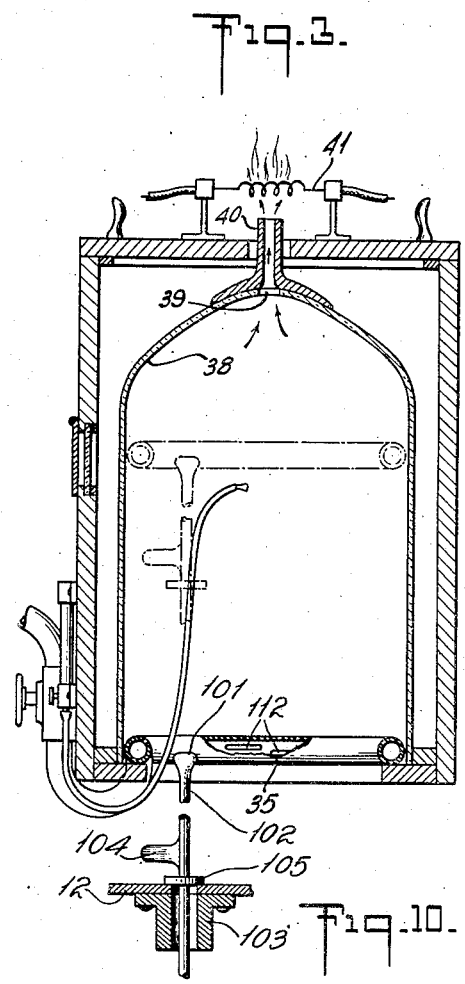
Fig.3.
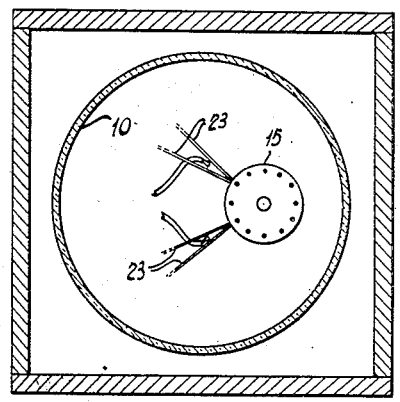
Fig.9.
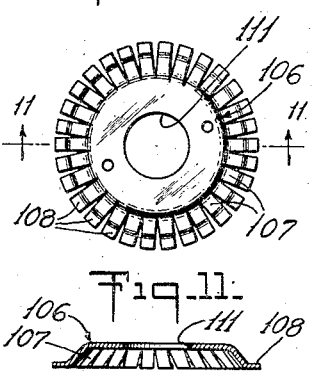
Fig.10.
Fig.11.
INVENTOR
WILLIAM C. HUGULEY.
BY
ATTORNEY

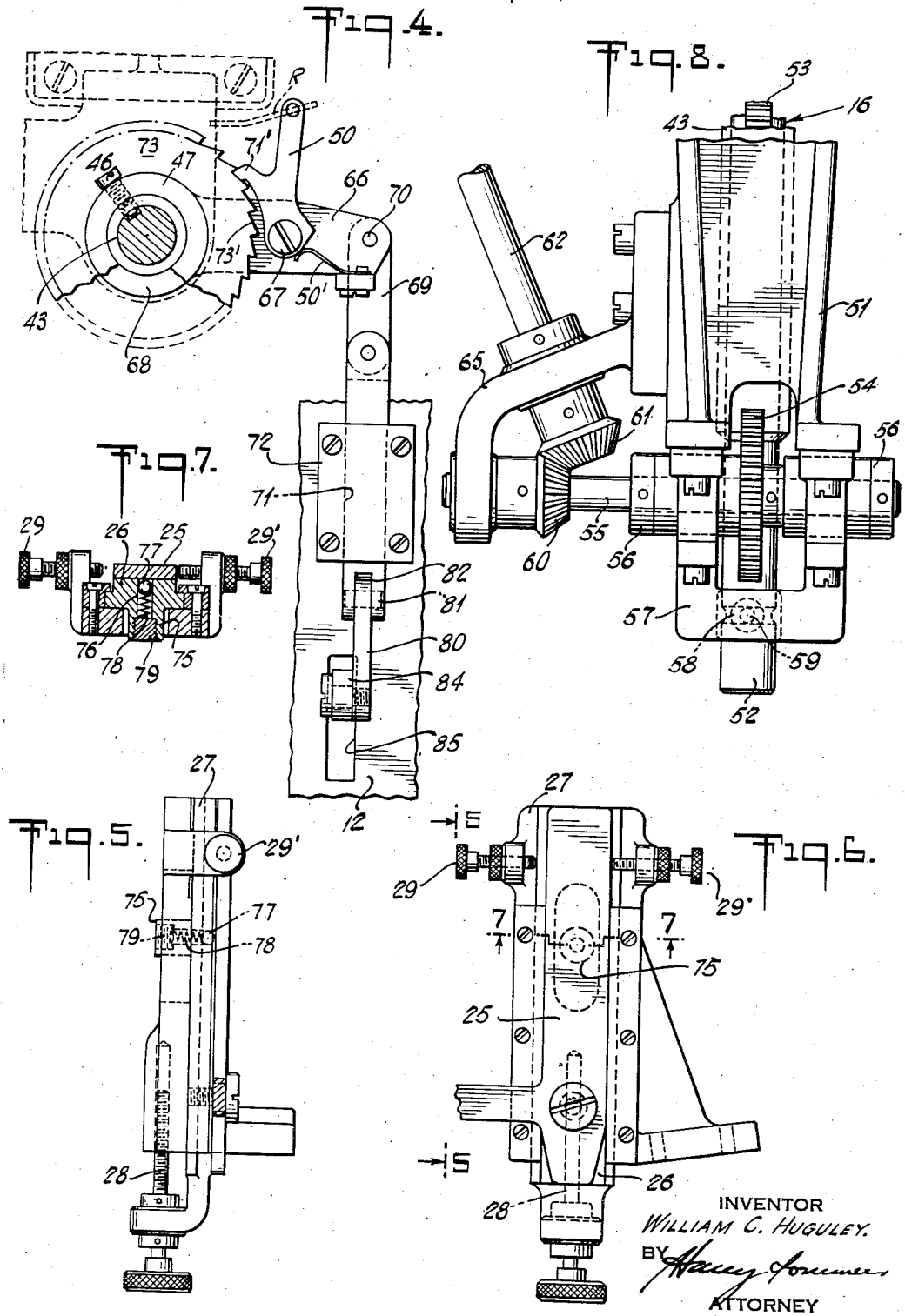

Patented Aug. 13, 1946

2,405,828

UNITED STATES PATENT OFFICE 2,405,828

APPARATUS FOR ARC WELDING

William C. Huguley, Belleville, N. J.

Application July 28, 1944, Serial No. 547,011

4 Claims. (Cl. 219—14)

This invention relates to an apparatus for arc welding, brazing, soldering and analogous operations. The invention is particularly adapted for use in arc welding systems wherein the arc is maintained in a gaseous atmosphere by directing a stream of hydrogen or other gas toward the arc gap.

In carrying out my invention, I preferably utilize an inverted bell jar as a chamber in which the arc welding apparatus may be positioned and operated. I have found that in the use of an apparatus of this character, occasionally there occurs a "backfiring" probably due to the air entering through the open end of the bell jar. The objection noted is preferably obviated in the carrying out of my invention by the provision of a system and apparatus for arc welding wherein the arc welding unit and the work to be welded are positioned in a chamber substantially isolated from the room atmosphere.

In the apparatus of my invention, an apparatus having electrodes defining an arc gap, is positioned within a chamber, and the operation of welding is performed therein, said chamber being provided with means for inspecting the operation from time to time and with means for moving the work into and out of the chamber and from station to station therein as desired. A further object of the invention is to provide an apparatus of the character described provided with means to substantially isolate the electrodes, the gas passed thereover, and the work being operated on from the atmosphere.

These and other advantageous objects, which will later appear, are accomplished by the simple and practical construction and arrangement of parts hereinafter described, and exhibited in the accompanying drawings, forming part hereof, wherein similar reference characters designate like parts, and in which:

Fig. 1 is an elevational, partly sectional view of the upper portion of the apparatus embodying my invention shown in Fig. 2, Fig. 2 is a perspective view of the apparatus, Fig. 3 is a sectional view of the chamber portion of the apparatus corresponding generally to the section of the chamber shown in Fig. 1 but showing a form thereof wherein the chamber is provided with a gas discharge outlet, Fig. 4 is a fragmentary, top plan view of the pawl and ratchet mechanism which may be utilized in carrying out my invention, taken on line 4—4 of Fig. 1, Fig. 5 is a side elevational view of a handle supporting means, taken on line 5—5 of Fig. 6, Fig. 6 is a front elevational view thereof, Fig. 7 is a transverse sectional view taken on line 7—7 of Fig. 6, Fig. 8 is an elevational view of a means for elevating and lowering the work which may be used in the apparatus of my invention, Fig. 9 is a horizontal sectional view of the chamber portion of another form of the invention, Fig. 10 is an enlarged top plan view, taken on line 10—10 of Fig. 1, of a spring member or the like which may be used in the apparatus of my invention, and Fig. 11 is a transverse sectional view, taken on line 11—11 of Fig. 10 and perpendicular to Fig. 10.

As shown in Fig. 1 of the drawings, embodying one form of my invention, the chamber housing 11 is preferably mounted on a suitable table 12 by means of brackets 13 or the like, whereby the said chamber housing 11 is disposed in spaced relation to the table 12, for a purpose presently explained. The table 12 is provided with means generally designated by the numeral 14 on which the work 15 is adapted to be positioned, and with means, generally designated by the numeral 16 (Fig. 2), for vertically reciprocating the work 15 into and out of the chamber 10 for the welding operation. The chamber 10 may, as shown in Fig. 1, be secured to the chamber housing 11 in any convenient or desired manner, as, for example, by being positioned on plate 17 defining the lower edge of chamber housing 11, the upper edge of the housing being preferably closed by cover 18, whereby said chamber 10 may be inserted into and removed from the chamber 10. The housing 11 is preferably made of an opaque material, while the chamber 10 may be of a transparent or translucent material; the housing 11 is preferably provided with one or more windows 19 having transparent panes 20, and with translucent doors 21 hinged at 22 to the housing 11 in registry with said windows so that the operator of the apparatus may look through the translucent door 21 to generally observe the welding operation or may look directly through the pane 20 when he desires to so do, by simply lifting the door 21.

The electrodes 23 are preferably mounted on a holding unit 24 which may be of any convenient or desired construction, said holding unit 24 being carried by a handle 25 (see Figs. 5–7) which is pivotally mounted on a bar 26, the latter being provided with a bolt 28 adapted to threadedly engage bearing 27 (see Fig. 5) for vertically adjusting the position of said handle and parts carried thereby. The bar 26 is slidably arranged in said bearing 27 (see Fig. 7) and the latter is provided with stop members 29, 29' for permitting limited pivotal movement of the handle 25 (and the unit 24) to bring the arc-defining ends of electrodes 23 into and out of operative proximity to the work 15 being operated on, as shown in Fig. 1. The bearing member 27 is maintained in spaced relation to the table 12 by being provided with a flanged portion 98 fixed to the bracket 97 having a spacing post portion 97' fixed to the table 12. The apparatus is provided with means, such as a pipe line 30, connected at one end to a source of hydrogen (not shown) having a discharge nozzle 31 carried by unit 24 or otherwise positioned in the apparatus, the nozzle being preferably directed toward the arc-defining ends of the electrodes to bring about the molecular-atomic reaction familiar to those skilled in this art to liberate or generate the intense heat used for welding. If desired, a gauge 32 and valve 33 may be interposed in the pipe line 30 and incorporated in the apparatus to enable the operator to observe and regulate the flow of gas. The apparatus described is subject to occasional "flaring up" and "back-firing" as well as to dilution of the hydrogen gas, due to air entering the chamber through the lower end thereof.

I have provided the novel means shown in Figs. 1 and 3 whereby a relatively inert gas, such as nitrogen, issuing from the pipe line 34 at the open end of chamber 10, may effectively obviate the objections referred to. By this arrangement the welding arc, the work being welded, and the hydrogen gas used in the apparatus are effectively sealed from the atmosphere.

Figs. 1 and 3 show forms of structure for this purpose, wherein the nitrogen pipe line 34 is connected to a ring 35 or the like, within the chamber 10, at the lower end thereof, said ring being provided with apertures 36 through which the nitrogen gas $N_2$ passes into the interior of the chamber 10. It will be noted that, as the discharge nozzle 31 of the hydrogen pipe line 30 is disposed within the chamber 10 at a distance above the ring 35, the upper portion of the interior of the chamber 10 will have a hydrogen atmosphere, while the lower portion thereof will have a nitrogen atmosphere. I have indicated the use of nitrogen gas as the same is lighter than oxygen and would therefore exclude the latter from entering the chamber 10. At the same time, nitrogen being lighter than oxygen but heavier than hydrogen, would effectively serve the purpose described, neither rising within the chamber to displace the hydrogen gas nor permitting oxygen from the atmosphere to enter the chamber. The nitrogen pipe line 34 may be provided with a gauge and valve 37 whereby the operator of the device may observe and regulate the passage of nitrogen gas into the chamber 10.

Any of the other substantially inert gases or vapors may be substituted for nitrogen within the scope of this invention. The use of the terms "hydrogen" and "nitrogen" in the specification and claims of the application shall be deemed to include gases or vapors of similar characteristics, within the scope of my invention.

In the structure shown in Fig. 3, the chamber 10 is provided with a dome-shaped upper portion 38 having an outlet aperture 39 through which the excess gases may escape or be discharged. If desired, the outlet aperture 39 may have a discharge conduit 40 in registry therewith for discharge into the atmosphere or into the path of a resistance unit 41 or the like as shown in Fig. 3, which will ignite the discharged gases.

While I have disclosed a resistance unit 41 which may be connected to a source of electric current (not shown) any other means may be substituted within the scope of the invention for the discharge or burning of the gases passing through the pipe 40.

I have described the apparatus wherein an electrode holding unit 24 may be mounted as shown in Fig. 1, for example; the structure described in connection with electrode holding unit 24 may be duplicated for simultaneous, station, or progressive welding within the purview of this invention. In Fig. 9, for example, there is a diagrammatic showing of the chamber 10 provided with two electrode holding units on which the pairs of electrodes 23 are mounted for welding the work 15.

While I have shown a cam and pawl structure for progressively rotating the work into the path of the electrode arc, as presently more particularly described, and a rack and pinion arrangement for elevating and lowering the work into and out of the chamber 10, any other means for attaining the same ends may be substituted within the purview of this invention.

The means shown in Figs. 1 and 4 for intermittently rotating the work 15 comprises a bar 42, to one end of which the work may be affixed in any desired or convenient manner, the other end of said bar passing through a tube 43 rotatably suspended in sleeve 44 which is preferably integral with bracket 97, spaced from the table 12 by the post 97'. Said bar 42 has a keyway 49 to receive a key 46 to key a boss 47, integral with the ratchet 45, to the tube 43 and bar 42, said key 46 passing through an aperture in tube 43 and into registry with keyway 49 of the bar 42. By the construction described, the bar 42 may be rotated step-by-step, in unison with the rotation of the ratchet 45, responsive to the action of pawl 50 in an arrangement more particularly shown in Fig. 4. The tube 43 has a collar 48 fixed to the upper end thereof, said collar being adapted to rotate on sleeve 44 of bracket 97. The tube extends freely into the casing 51 to a point adjacent the lower end thereof as shown in Fig. 8. The bar 42, even when elevated to its highest position, shown in Fig. 1, protrudes into the casing 51 and is connected therein with a post 52 also slidably arranged in the tube 43, the connection of parts 42 and 52 being generally designated by the broken showing (Fig. 1) as a pin in post 52 protruding into the perimeter recess of a stud carried by bar 42, the stud being rotatably received in a recess in post 52, the arrangement being such that the parts will vertically reciprocate in the tube 43 in unison but the post 52 will not rotate on the rotation of the bar 42. The post 52 is provided with a rack 53 keyed thereto by any desired or convenient means and adapted to be engaged by the pinion 54 or the like keyed to shaft 55 which is rotatably journalled in bearings 56 in the open housing 57 secured to the lower end of casing 51. The lower end of the rack 53 is provided with a circumferential perimeter recess 58 adapted to be engaged by the free end of a spring or similar yieldable means 59 fixed at one end to the housing 57, when said circumferential recess is in registry with said springs 59. The shaft 55 to which the pinion 54 is keyed has a gear 60 in mesh with a gear 61 (see Fig. 8) the latter being keyed to the lower end of a post 62, the upper end of said post having the handwheel 63 or the like keyed thereto adjacent table 12. The post 62 is journalled in bearings 64 and 65 or the like integral with or secured to the table 12 and casing 51 respectively, the last mentioned bearing serving also as a support for one end of shaft 55 as shown in Fig. 8.

The pawl 50 (see Fig. 4) may be actuated by any suitable or convenient means. For example, said pawl may be pivotally mounted on a link 66 by pivot pin 67, the link being provided with a ring 68 (preferably integral therewith) rotatably disposed on the tube 43 as shown in Fig. 4. Link 66 is pivotally secured at 70 to link 69 which is positioned in the aperture 71 of bearing 72 and is adapted to be reciprocated therein, so that, as will be apparent from an inspection of Fig. 4, on reciprocating the link 69 through the aperture 71 of the bearing 72, the link 66 will be pivoted around the tube 43, causing the nose 71' of the pawl 50 to progressively engage teeth 73' of ratchet 73 which is integral with and has an upstanding boss 47 provided with an aperture through which the key 46 passes for registry with the keyway 49 of the bar 42 as previously described. Spring 50' is fixed at one end to the link 66, the free end of the spring bearing against the pawl 50 serving to maintain the pawl in engagement with the ratchet. A rod R or the like may engage the link to enable the latter to be manually displaced from the ratchet by the operator when desired.

The bar 42 and the work 15 carried thereby are rotated in a step-by-step rotation to position the work in registry with the arc defined by the electrodes 23, as will be apparent from an inspection of Fig. 1. A plurality of units 74 of work 15 to be welded may thus be selectively brought into registry with the electrodes. The operator can selectively tilt the electrode holder unit 24 into its operative position for welding the work, in which position the handle 25 will abut the stop 29'. To maintain the electrode holding unit 24 in the position of selected abutment with the stop 29 or a stop 29', I have provided means for frictionally engaging the handle 25 of the electrode holding unit, said means being sectionally shown in Fig. 7, and comprising a threaded boss 75 on the bar 26 in registry with an aperture 76, a ball piece 77 being positioned in said aperture 76 with spring 78 interposed between said member 77 and a nut 79 closing the boss 75 and maintaining the spring in position. As will be apparent from Fig. 7, ball piece 77 will be constantly held in frictional engagement with the handle 25 to maintain the latter in the position in which it has been placed by the operator until it is desired to manually tilt the same to another position.

Any desired or convenient means may be provided for reciprocating the link 69 in the aperture 71 of the bearing 72. For example, as shown in the drawings, said means may comprise a link 80 pivoted to the link 69 by any suitable or convenient means, such as, for example by a pivot pin 81 passing through both of said members, one end of link 80 being positioned in a slot 82 at the end of the link 69, the other end of link 80 being pivotally secured to rod 84 which depends downwardly at substantially right angles through an elongated aperture 85 in the table 12. Rod 84 is medially pivoted in bearing 86 by pivot pin 87 or the like, as will be apparent from an inspection of Figs. 4 and 1. On the horizontal reciprocating of the lower end of the rod 80, the upper end of said rod will be reciprocated and this motion will be transmitted to the link 69 in the form of a horizontal straight reciprocating motion instead of an arcuate reciprocation.

The lower end of the rod 84 is reciprocated in any desired or convenient manner, preferably, as shown in Figs. 1 and 2, by providing said rod with an elongated slot 88 at the lower end thereof to freely receive a pin 89 eccentrically fixed to and depending from the face of disc 90 keyed to the shaft 91 of a speed reducing unit which is actuated through pulley or other means 92 by a motor 93. Any other arrangement for imparting reciprocating motion to the lower end of the rod 84 may be substituted, within the scope of my invention. It will be apparent that on the continuous rotation of the shaft 91 which is, as described, preferably actuated by the motor 93, the plate 90 will rotate and, as the pin 89 is eccentrically disposed on the plate 90 relative to the shaft 91, the pin 89 moving in slot 88 of rod 84 will reciprocate rod 84 and actuate pawl 50.

The electrodes 23 are preferably connected to a source of current (not shown) by any suitable or convenient means, as for example, by the electric cables 91 carried by the handle 25 and having electrical connection with the electrodes 23 in any desired or convenient manner, said cables 91 being connected with an electric power source. If desired, the apparatus may be provided with a meter for informing the operator of voltage and other conditions, said meter being generally shown in Fig. 2 and being designated by the numeral 95, the meter connections being of any conventional or desired type.

A work-holding fixture 96 is provided for holding the work, said fixture at the underside thereof having a stop piece 99 adapted to have abutting registry with the collar 48 of the tube 43 (when the bar 42 is in its lowermost position) and with a cap 100.

By rotating the handle 63, the gears 61 and 60 will mesh, rotating the shaft 55, whereby the pinion 54 will engage the rack 53 to raise the post 52 and bar 42. When the parts have been elevated to the position shown in Fig. 1, the recess 58 at the lower end of the post 52 will register with the springs 59 of housing 57 and said springs will snap into the recess 58 to thereby latch the parts and maintain them against accidental displacement during the step-by-step rotation of the bar 42 as above described. When it is desired to lower the work, the handwheel 63 is rotated in a reverse direction, causing the gears 61 and 60 to mesh and the pinion 54 to mesh with the rack 53 and move the post 52 downwardly to initially displace the springs 59 from the recess 58 in the post 52. As soon as the post 52 has displaced the springs 59, the post 52 and bar 42 of the work holder will move downwardly practically of their own weight (the handwheel 63 rotating, of course), until the stop 99 abuts collar 48 of the tube 43.

The external diameter of the ring 35 is preferably slightly less than the internal diameter of the chamber 10 and the ring 35 may be provided with means to vertically reciprocate the same within the chamber 10, as shown in Figure 3, this arrangement being equally applicable to other forms of the invention, such as that shown in Fig. 1. The reciprocating means may comprise, for example, the bracket member 101 fixed to the ring 35, said bracket member being fixed to a bar 102, said bar 102 passing freely through sleeve 103 or the like carried by the table 12. Bar 102 is provided with handle 104 or the like by means of which the same may be vertically reciprocated, and with a stop protuberance 105 or the like which is normally adapted to abut the table 12 so that the parts will be at rest as shown in full lines in Fig. 3, with the ring 35 adjacent the open end of the chamber 10. The ring 35 is provided with apertures 112 or the like at the outer periphery thereof to provide for the escape of nitrogen gas therethrough and against the inner walls of chamber 10.

By the arrangement described, it will be apparent that the operator of the device may conveniently vertically reciprocate the ring 35 to and from the dotted line position indicated in Fig. 3 to "sweep" the inner walls of the chamber 10 with the ring 35, the nitrogen gas escaping through the apertures 112 being directed thereby against the inner walls of said chamber, effectively cleaning the same. This arrangement provides a novel means for cleaning the chamber. If desired, other mechanical or manual means may be provided to attain this end.

The pipe line 34 may be of a length which will readily permit of its accompanying the vertical reciprocation of the ring 35 in the chamber 10 as above described or may be made of a flexible structure for that purpose.

It is desirable in welding, soldering, and brazing operations that the sections of the work at the point of application of heat and contact of parts or addition of the soldering or fusing materials or alloys be maintained under tension so that there may be a proper "follow through" during the flow of the materials on the application of high temperatures attained by the means employed, such as by the electrodes 23 or the like. Any suitable tension means may be used within the scope of my invention for this purpose. I have illustrated in Figs. 10 and 11 one convenient form of tension means. In Fig. 10 there is shown a plate 106, preferably of spring metal, radially slitted to provide a plurality of radial spring fingers 107, which, as shown in Fig. 11, are downwardly bent and flattened at their peripheral ends 108, said spring fingers 107 being preferably of a number at least equal to the number of unit parts 74 of work positioned in the work holding fixture 96. Said fixture is so constructed that the upper end of each unit 74 of work projects through the upper end 109 (Fig. 1) of work holding fixture 96, the spring plate 106 being so arranged in fixture 96 that the ends 108 of spring fingers 107 will bear upon the protruding ends of the units 74 of work and will hold said units 74 tensioned against the other sections 110 of work positioned in the work holding fixture 96. The spring plate 106 is preferably provided with aperture 111 or the like adapted to have sliding engagement with the post 42 or like positioning means in the work holding fixture 96. Any other desired or convenient means may be used to hold the said spring plate 106 in the work holding fixture 96.

As before stated, the apparatus of my invention is adapted for use in welding, brazing, soldering and analogous operations wherein the structure may be used to advantage; to this end, conventional expedients, such as the interposing of silver soldering rings and the like between the parts to be united, etc., which would be obvious to those skilled in the art, may be utilized in practicing the invention. The term "arc welding" wherever used in the title, specification and claims of this application shall be deemed to include other systems such as soldering, brazing and the like, wherein the structure of the invention may be used to advantage.

Having thus described my invention, what I claim as new and desire to secure by Letters Patent is:

1. An apparatus for arc welding comprising a chamber, means for introducing the work to be welded into said chamber, a pair of electrodes pivotally mounted and axially adjustably positioned in said apparatus for juxtapositioning relative to the work, means for advancing said work relative to said electrodes, means for enveloping the electrode ends and work in a hydrogen atmosphere and means to seal said hydrogen atmosphere from the atmosphere of the room in which the apparatus is located.

2. In an apparatus for arc welding, a table, a chamber provided with an open end, bracket means on said table engaging said chamber to position the latter on the table in spaced relation thereto and with the open end thereof facing the table, a post fixed to said table in spaced relation to the open end of said chamber, a bracket secured to said post, a bearing on said bracket, a handle pivotally mounted on said bearing, means to axially adjust the position of the handle on the bearing, stop members on said bracket to limit the pivotal movement of said handle thereon, and means reciprocably positioned in said table for carrying articles to be welded into and out of said chamber, said handle being adapted to have electrode members secured thereto, whereby said electrode members may be reciprocated in said chamber relative to the work on the limited pivotal movement of said handle.

3. In an apparatus for arc welding, a table, a chamber provided with an open end, bracket means on said table engaging said chamber to position the latter on the table in spaced relation thereto, and with the open end thereof facing the table, a post fixed to said table in spaced relation to the open end of said chamber, a bracket secured to said post, a handle pivotally mounted on said bracket, stop members on said bracket to limit the pivotal movement of said handle thereon, means reciprocably positioned in said table for carrying articles to be welded into and out of said chamber, and means engaging said handle to secure electrode members thereto, whereby said electrode members may be reciprocated in said chamber relative to the work by the limited pivotal movement of said handle.

4. In an apparatus for arc welding, a table, a chamber provided with an open end, bracket means on said table engaging said chamber to position the latter on the table in spaced relation thereto, and with the open end thereof facing the table, a post fixed to said table in spaced relation to the open end of said chamber, a bracket secured to said post, an electrode supporting member pivotally mounted on said bracket, stop members on said bracket to limit the pivotal movement of said member thereon, and means on said table for selectively carrying articles to be welded into and out of said chamber.

WILLIAM C. HUGULEY.